(12) United States Patent
Aamer

(10) Patent No.: US 9,328,206 B2
(45) Date of Patent: *May 3, 2016

(54) SELF-ASSEMBLING POLYMERS—III

(71) Applicant: PALL CORPORATION, Port Washington, NY (US)

(72) Inventor: Khaled Abdel-Hakim Helmy Aamer, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/292,722

(22) Filed: May 30, 2014

(65) Prior Publication Data

US 2015/0344641 A1    Dec. 3, 2015

(51) Int. Cl.

| | | |
|---|---|---|
| *B01D 71/64* | (2006.01) | |
| *B01D 71/80* | (2006.01) | |
| *C08F 297/08* | (2006.01) | |
| *C08F 234/02* | (2006.01) | |
| *C08F 8/04* | (2006.01) | |
| *C08F 293/00* | (2006.01) | |
| *C08F 297/06* | (2006.01) | |
| *C08G 81/00* | (2006.01) | |
| *C08G 61/08* | (2006.01) | |
| *B01D 71/26* | (2006.01) | |
| *C08G 61/12* | (2006.01) | |

(52) U.S. Cl.
CPC ............... *C08G 81/00* (2013.01); *B01D 71/26* (2013.01); *B01D 71/64* (2013.01); *C08F 234/02* (2013.01); *C08F 293/00* (2013.01); *C08F 297/06* (2013.01); *C08F 297/08* (2013.01); *C08G 61/12* (2013.01); *C08G 61/125* (2013.01); *C08G 2261/126* (2013.01); *C08G 2261/148* (2013.01); *C08G 2261/1424* (2013.01); *C08G 2261/3342* (2013.01); *C08G 2261/418* (2013.01); *C08G 2261/614* (2013.01)

(58) Field of Classification Search
None
See application file for complete search history.

(56) References Cited

U.S. PATENT DOCUMENTS

| | | |
|---|---|---|
| 3,318,959 A | 5/1967 | Borman |
| 3,625,977 A | 12/1971 | Hamb |
| 3,847,867 A | 11/1974 | Heath et al. |
| 4,242,384 A | 12/1980 | Andrew et al. |
| 4,611,048 A | 9/1986 | Peters |
| 4,698,388 A | 10/1987 | Ohmura et al. |
| 4,725,441 A | 2/1988 | Porter et al. |
| 4,945,135 A | 7/1990 | Gubbs et al. |
| 4,948,508 A | 8/1990 | Nakagawa et al. |
| 4,954,256 A | 9/1990 | Degen et al. |
| 4,965,330 A | 10/1990 | Asrar |
| 5,191,026 A | 3/1993 | Nishi et al. |
| 5,198,554 A | 3/1993 | Inagaki et al. |
| 5,202,388 A | 4/1993 | Iio et al. |
| 5,282,965 A | 2/1994 | Urairi et al. |
| 5,286,382 A | 2/1994 | Scarmoutzos et al. |
| 5,462,867 A | 10/1995 | Azad et al. |
| 5,580,934 A | 12/1996 | Nishi et al. |
| 5,599,882 A | 2/1997 | Nishi et al. |
| 5,824,049 A | 10/1998 | Ragheb et al. |
| 5,911,880 A | 6/1999 | Klein et al. |
| 5,969,170 A | 10/1999 | Grubbs et al. |

(Continued)

FOREIGN PATENT DOCUMENTS

| | | |
|---|---|---|
| EP | 0 298 408 A1 | 1/1989 |
| EP | 0 409 291 A2 | 1/1991 |

(Continued)

OTHER PUBLICATIONS

Adams, Marisa et al., "Investigation of microphase separated dicarboximide-functionalized oxanorbornyl diblock copolymers exhibiting nanostructure," Abstracts of Papers, 247th ACS National Meeting & Exposition, Dallas, TX, United States, Mar. 16-20, 2014.
Asif, A. et al., "Hydroxyl terminated poly(ether ether ketone) with pendant methyl group-toughened epoxy clay ternary nanocomposites: Preparation, morphology, and thermomechanical properties," *Journal of Applied Polymer Science*, vol. 106, No. 5, pp. 2936-2946 (Dec. 5, 2007) (Abstract).
Bang, Joona et al., "Defect-Free Nanoporous Thin Films from ABC Triblock Copolymers," *Journal of the American Chemical Society*, vol. 128, pp. 7622-7629 (2006).
"Spin Coat Theory," Brewer Science, Inc., http://www.brewerscience.com/research/processing-theory/spin-coating-theory, downloaded Jun. 30, 2014 (no original publication or copyright date available).

(Continued)

*Primary Examiner* — Jeffrey Mullis
(74) *Attorney, Agent, or Firm* — Leydig, Voit and Mayer, Ltd.

(57) ABSTRACT

Disclosed are self-assembling diblock copolymers of the formula (I):

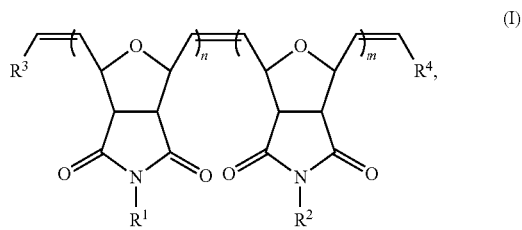

wherein $R^1$ is $-(CHR-CH_2-O)_p-R'$, p=2-6, R is H or methyl, and R' is H, $C_1$-$C_6$ alkyl, or $C_3$-$C_{11}$ cycloalkyl, $R^2$ is $C_6$-$C_{20}$ aryl, one of $R^3$ and $R^4$ is $C_6$-$C_{14}$ aryl or heteroaryl, and the other is $C_1$-$C_{22}$ alkoxy, and n and m are independently 2 to about 2000, which find use in preparing self-assembled structures and porous membranes. Embodiments of the self-assembled structures contain the diblock copolymer in a cylindrical morphology. Also disclosed is a method of preparing such copolymers.

20 Claims, 2 Drawing Sheets

(56) References Cited

U.S. PATENT DOCUMENTS

| | | | |
|---|---|---|---|
| 5,976,380 | A | 11/1999 | Moya |
| 5,998,326 | A | 12/1999 | Hafner et al. |
| 6,039,872 | A | 3/2000 | Wu et al. |
| 6,096,020 | A | 8/2000 | Hofmann |
| 6,111,121 | A | 8/2000 | Grubbs et al. |
| 6,126,825 | A | 10/2000 | Shinagawa et al. |
| 6,214,936 | B1 | 4/2001 | Mehler et al. |
| 6,354,443 | B1 | 3/2002 | Moya |
| 6,420,503 | B1 | 7/2002 | Jayaraman et al. |
| 6,486,264 | B1 | 11/2002 | Tsunogae et al. |
| 6,669,980 | B2 | 12/2003 | Hansen |
| 6,734,386 | B1 | 5/2004 | Lauterbach et al. |
| 6,759,537 | B2 | 7/2004 | Grubbs et al. |
| 6,846,890 | B2 | 1/2005 | Miyaki et al. |
| 6,867,303 | B2 | 3/2005 | Grela |
| 6,921,735 | B2 | 7/2005 | Hoveyda et al. |
| 7,037,993 | B2 | 5/2006 | Taguchi et al. |
| 7,230,066 | B2 | 6/2007 | Khouri et al. |
| 7,284,668 | B2 | 10/2007 | Charkoudian |
| 7,300,022 | B2 | 11/2007 | Muller |
| 7,329,758 | B1 | 2/2008 | Grubbs et al. |
| 7,332,609 | B2 | 2/2008 | Emrick et al. |
| 7,378,528 | B2 | 5/2008 | Herrmann et al. |
| 7,611,629 | B2 | 11/2009 | Doucoure et al. |
| 7,628,917 | B2 | 12/2009 | Penezina et al. |
| 7,717,273 | B2 | 5/2010 | Kozlov et al. |
| 7,750,103 | B2 | 7/2010 | Emrick et al. |
| 7,960,555 | B2 | 6/2011 | Emrick |
| 8,048,963 | B2 | 11/2011 | Fuller et al. |
| 8,049,025 | B2 | 11/2011 | Zhan |
| 8,053,531 | B2 | 11/2011 | Hirata et al. |
| 8,153,739 | B2 | 4/2012 | Tew et al. |
| 8,223,472 | B1 | 7/2012 | Dirk et al. |
| 8,232,360 | B2 | 7/2012 | Sampson et al. |
| 8,277,914 | B2 | 10/2012 | Ogawa et al. |
| 8,283,410 | B2 | 10/2012 | Musa |
| 8,329,927 | B2 | 12/2012 | Tew et al. |
| 8,420,704 | B2 | 4/2013 | Hillmyer et al. |
| 8,440,765 | B2 | 5/2013 | Balsara et al. |
| 8,535,590 | B2 | 9/2013 | Milner et al. |
| 8,647,730 | B2 | 2/2014 | Kudo et al. |
| 2001/0021764 | A1 | 9/2001 | Weisse et al. |
| 2002/0040109 | A1 | 4/2002 | Fogg et al. |
| 2003/0064884 | A1 | 4/2003 | Yao |
| 2005/0176893 | A1 | 8/2005 | Rana et al. |
| 2007/0238853 | A1 | 10/2007 | Hay et al. |
| 2008/0103256 | A1 | 5/2008 | Kim et al. |
| 2009/0082524 | A1* | 3/2009 | Tew et al. ............... 525/55 |
| 2009/0127186 | A1 | 5/2009 | Mizomoto et al. |
| 2009/0173694 | A1 | 7/2009 | Peinemann et al. |
| 2009/0233236 | A1 | 9/2009 | Black et al. |
| 2009/0236309 | A1 | 9/2009 | Millward et al. |
| 2009/0263725 | A1* | 10/2009 | Balsara et al. ............ 429/322 |
| 2010/0230351 | A1 | 9/2010 | Hoving et al. |
| 2011/0120970 | A1 | 5/2011 | Joo et al. |
| 2011/0206880 | A1 | 8/2011 | Wang et al. |
| 2012/0041137 | A1 | 2/2012 | Musa et al. |
| 2012/0077893 | A1 | 3/2012 | Hood |
| 2013/0041055 | A1 | 2/2013 | Hillmyer et al. |
| 2013/0165661 | A1 | 6/2013 | Grubbs et al. |
| 2013/0189504 | A1 | 7/2013 | Nealey et al. |
| 2013/0280237 | A1 | 10/2013 | Tew et al. |
| 2014/0011958 | A1 | 1/2014 | Miyake et al. |

FOREIGN PATENT DOCUMENTS

| | | |
|---|---|---|
| EP | 0 430 585 A2 | 6/1991 |
| EP | 0 713 893 A1 | 5/1996 |
| EP | 0 784 066 A1 | 7/1997 |
| EP | 0 922 486 A1 | 6/1999 |
| EP | 0 968 758 A2 | 1/2000 |
| EP | 1 238 996 A1 | 9/2002 |
| EP | 1 408 064 A1 | 4/2004 |
| EP | 1 783 149 A1 | 5/2007 |
| EP | 1 903 074 A1 | 3/2008 |
| EP | 2 639 247 A1 | 9/2013 |
| JP | S51-151275 A | 12/1976 |
| JP | S52-122278 A | 10/1977 |
| JP | 2010-155919 A | 7/2010 |
| KR | 1020090089041 A | 8/2009 |
| WO | WO 99/47570 A1 | 9/1999 |
| WO | WO 01/61042 A2 | 8/2001 |
| WO | WO 02/072659 A1 | 9/2002 |
| WO | WO 2006/130955 A1 | 12/2006 |
| WO | WO 2009/001724 A1 | 12/2008 |
| WO | WO 2010/101882 A1 | 9/2010 |
| WO | WO 2011/112796 A1 | 9/2011 |
| WO | WO 2011/140158 A1 | 11/2011 |
| WO | WO 2013/028308 A1 | 2/2013 |
| WO | WO 2013/097570 A1 | 7/2013 |

OTHER PUBLICATIONS

Francis, Bejoy et al., "Synthesis of hydroxyl-terminated poly(ether ether ketone) with pendent *tert*-butyl groups and its use as a toughener for epoxy resins," *Journal of Polymer Science Part B: Polymer Physics*, vol. 44, No. 3, pp. 541-556 (Feb. 1, 2006) (Abstract).

Girotto, Claudio et al., "Spray coating for fabricating polymer-based organic solar cells," *Global Solar Technology*, pp. 10-13 (Mar. 2010).

Guillen, Gregory R. et al., "Preparation and Characterization of Membranes Formed by Nonsolvent Induced Phase Separation: A Review," *Industrial & Engineering Chemistry Research*, vol. 50, pp. 3798-3817 (2011).

Hahn et al., "Structure Formation of Integral-Asymmetric Membrane of Polystyrene-block-Poly(ethylene oxide)," *J. Polym. Sci. B Polym. Phys.*, 51: 281-290 (2013).

Hall, David B. et al., "Spin Coating of Thin and Ultrathin Polymer Films," *Polymer Engineering and Science*, vol. 38, No. 12, pp. 2039-2045 (Dec. 1998).

Hollister, Adrienne et al., "Synthesis and physical properties of dicarboximide-functionalized oxanorbornyl polymers," Abstracts of Papers, 241st ACS National Meeting & Exposition, Anaheim, CA, United States, Mar. 27-31, 2011.

Hollister, Adrienne et al., "Towards novel thin-film polymer blends: Synthesis and characterization of norbornene related homopolymers and diblock copolymers via ring opening metathesis polymerization," Abstracts of Papers, 239th ACS National Meeting, San Francisco, CA, United States, Mar. 21-25, 2010.

Ledoux, Nele, "Ruthenium Olefin Metathesis Catalysts: Tuning of the Ligand Environment," *Universiteit Gent*, pp. 1-198 (2007).

Li, Li, "Nanoporous Polymers for Membrane Applications," Ph.D. Thesis, DTU Chemical Engineering, pp. 1-180 (Jan. 2012).

Love, Jennifer A. et al., "A Practical and Highly Active Ruthenium-Based Catalyst that Effects the Cross Metathesis of Acrylonitrile," *Angewandte Chemie*, vol. 41, No. 21, pp. 4035-4037 (2002).

Lu, Hua et al., "One-Pot Synthesis of Brush-Like Polymers via Integrated Ring-Opening Metathesis Polymerization and Polymerization of Amino Acid N-Carboxyanhydrides," *Journal of the American Chemical Society*, vol. 131, pp. 13582-13583 (2009).

Mulder, M., "Phase Inversion Membranes," *Membrane Preparation: Phase Inversion Membranes*, pp. 3331-3346 (2000).

Oss-Ronen, Liat et al., "Characterization of Block Copolymer Self-Assembly: From Solution to Nanoporous Membranes," *Macromolecules*, vol. 45, pp. 9631-9642 (2012).

Park, Miri et al., "Block Copolymer Lithography: Periodic Arrays of ~$10^{11}$ Holes in 1 Square Centimeter," *Science*, vol. 276, pp. 1401-1404 (May 30, 1997).

Peinemann, Klaus-Viktor et al., "Asymmetric superstructure formed in a block copolymer via phase separation," *Nature Materials*, vol. 6, pp. 992-996 (Dec. 2007).

Posselt, Kyle et al., "Synthesis and characterization of dicarboximide-functionalized oxanorbornyl homopolymer and diblock copolymers," Abstracts of Papers, 243rd ACS National Meeting & Exposition, San Diego, CA, United States, Mar. 25-29, 2012.

Richmond, Victoria et al., "Synthesis and characterization of dicarboximide-functionalized oxanorbornyl homopolymers with ethylene oxide side chains," Abstracts of Papers, 247th ACS National Meeting & Exposition, Dallas, TX, United States, Mar. 16-20, 2014.

(56) References Cited

OTHER PUBLICATIONS

Riffle, J.S. et al., "Synthesis of hydroxyl-terminated polycarbonates of controlled number-average molecular weight," *Journal of Polymer Science: Polymer Chemistry Edition*, vol. 20, No. 8, pp. 2289-2301 (Aug. 1982) (Abstract).
Sahu, Niranjan et al., "Fundamental understanding and modeling of spin coating process: A review," *Indian Journal of Physics*, vol. 83, No. 4, pp. 493-502 (2009).
Sommer, William, "Olefin Metathesis," Sigma-Aldrich Chemical Co., Inc., *ChemFiles*, vol. 9, No. 6, pp. 3-11 (2009).
Srinivasan, Siddarth et al., "Solution Spraying of Poly(methyl methacrylate) Blends to Fabricate Micro-textured, Superoleophobic Surfaces," Manuscript (downloaded May 19, 2014).
Thurn-Albrecht, Thomas et al., "Nanoscopic Templates from Oriented Block Copolymer Films," *Advanced Materials*, vol. 12, No. 11, pp. 787-791 (2000).
Walheim, Stefan et al, "Structure Formation via Polymer Demixing in Spin-Cast Films," *Macromolecules*, vol. 30, pp. 4995-5003 (1997).
"Polyester ether ketone (PEEK)," Wikipedia, http://en.wikipedia.org/wiki/PEEK, downloaded Jun. 11, 2014.
Yang, Yong-qiang et al., "Preparation of PPESK Hollow Fiber Asymmetric Nanofiltration Membrane," *The Proceedings of the 3$^{rd}$ International Conference on Functional Molecules*, pp. 295-296 (May/Jun. 2011).
Yun, Yanbin et al, "Preparation of an Ultrafiltration Membrane from Poly(Phthalazine Ether Sulfone Ketone)," *Integrated Concepts in Water Recycling*, pp. 741-752 (2005).
Zhang, Yanfeng et al., "PEG-Polypeptide Dual Brush Block Copolymers: Synthesis and Application in Nanoparticle Surface PEGylation," *ACS Macro Letters*, vol. 2, pp. 809-813 (2013).
Çetinkaya et al., "Preparation of a new nanoconductive ROMP copolymer and its application as solid polymer electrolyte," *Synthetic Metals*, vol. 180, pp. 59-63 (2013).
Dalphond et al., "Synthesis and Self-Assembly of Polymers Containing Dicarboximide Groups by Living Ring-Opening Metathesis Polymerization," *Macromol. Cehm. Phys.*, vol. 203, pp. 1988-1994 (2002).
Love et al., "A Practical and Highly Active Ruthenium-Based Catalyst that Effects the Cross Metathesis of Acrylonitrile," *Agnew. Chem. Int. Ed.*, vol. 41, No. 21, pp. 4035-4037 (2002).
Metera et al., "Luminescent Iridium(III)-Containing Block Copolymers: Self-Assembly into Biotin-Labeled Micelles for Biodetection Assays," *ACS Macro Letters*, vol. 1, pp. 954-959 (2012).
Runge et al., "Synthesis of Tri- and Tetrablock Copolymers Catalyzed by the Grubbs First Generation Catalyst," *Macromolecular Rapid Communications*, vol. 30, pp. 1392-1398 (2009).
Sankaran et al., "Ring-Opening Metathesis Polymers for Biodetection and Signal Amplification: Synthesis and Self-Assembly," *Macromolecules*, vol. 43, pp. 5530-5537 (2010).
Vargas et al., "Synthesis and ring-opening metathesis polymerization (ROMP) of new N-fluoro-phenylnorbornene dicarboximides by 2$^{nd}$ generation ruthenium alkylidene catalysts," *eXPRESS Polymer Letters*, vol. 1, No. 5, pp. 274-282 (2007).

Zha et al., "Magnetic Properties of Cobalt-Containing Diblock Copolymers with Cylindirical Morphology of Different Domain Sizes," *J. Inorg. Organomet. Polym.*, No. 23, pp. 89-94 (2013).
European Patent Office, Extended European Search Report in European Patent Application No. 15 16 3659 (Jun. 8, 2015).
Breitenkamp et al.:"Rapid communication, Amphiphilic Ruthenium Benzylidene Metathesis Catalyst with PEG-substituted Pyridine Ligands," Journal of Polymer Science: Part A: Polymer Chemistry, vol. 43, pp. 5715-5721 (2005).
Çetinkaya et al., "Synthesis of high-T g polymers via ROMP of oxanorbornene dicarboximides with halogen groups," Heteroatom Chemistry, vol. 21, No. 1 (Jan. 1, 2010), pp. 36-43.
Chen B. et al., "Ruthenium Bipyridine-Containing Polymers and Block Copolymers via Ring-Opening Metathesis Polymerization," *Macromolecules*, vol. 37, pp. 5866-5872 (2004).
Dimitriou et al., "Amphiphilic block copolymer surface composition: Effects of spin coating versus spray coating," Polymer, vol. 53(6), pp. 1321-1327 (Dec. 26, 2011).
Dirk et al., "High temperature polymer dielectrics from the ring opening metathesis polymerization (ROMP)," Pulsed Power Conference 2009 (PPC '09), IEEE, Piscataway, New Jersey, pp. 332-335 (Jun. 28, 2009).
Kluger et al., "Functionalized Poly(oxabornene)-Block-Copolymers: Preparation via Romp/Click-Methodology," Journal of Polymer Science: Part A: Polymer Chemistry, vol. 45, pp. 485-499 (2007).
McLaughlin et al., "Three-Dimensional Organization of Block Copolymers on 'DNA-Minimal' Scaffolds," Journal of the American Chemical Society, vol. 134, pp. 4280-4286 (2012).
Samanta et al., "Click chemistry to give pegylated pyridine and water soluble Ruthenium benzylidene catalysts," Polymer Preprints, vol. 49, No. 1, p. 150 (2008).
Singh et al., "A review on membrane fabrication: Structure, properties and performance relationship," Desalination, vol. 326, pp. 77-95 (Aug. 16, 2013).
Tlenkopatchev et al., "Gas Transport in Polymers Prepared via Metathesis Copolymerization of exo-N-Phenyl-7-oxanorbornene-5,6-dicarboximide and Norbornene," Macromolecules, vol. 36, pp. 8483-8488 (2003).
Vargas et al., "Gas transport in membranes based on polynorbornenes with fluorinated dicarboximide side moieties," Journal of Membrane Science, vol. 361, pp. 78-88 (2010).
Vargas et al., "Ring-opening metathesis polymerization (ROMP) of N-cycloalkyl-7-oxanorbornene dicarboximides by well-defined ruthenium initiators," European Polymer Journal, vol. 40, pp. 1325-1335 (2004).
Wu et al., "Design and Preparation of Porous Polymers," Chemical Reviews, vol. 112(7), pp. 3959-4015 (Jul. 11, 2012).
Yoon et al., "Synthesis and Structure-Property Comparisons of Hydrogenated Poly(oxanorbornene-imide)s and Poly(norbornene-imide)s Prepared by Ring-Opening metathesis Polymerization," Journal of Polymer Science Part A: Polymer Chemistry, vol. 50, pp. 3914-3921 (2012).
Singapore Patent Office, Search Report in Singapore Application No. 10201503013R (Sep. 11, 2015).

\* cited by examiner

SELF-ASSEMBLING POLYMERS—III

BACKGROUND OF THE INVENTION

Polymers, in particular block copolymers, which self-assemble into nanostructures have been proposed for use in a number of applications including filtration membranes, pervaporation membranes, lithography, solid state polymer electrolytes, ion exchange membranes, and biomaterials. For example, diblock copolymers when dissolved in selective solvents self-assemble into spherical or cylindrical micelles, vesicles and other structures. However, challenges remain in obtaining well defined nanostructures. The foregoing indicates that there is an unmet need for block copolymers that self-assemble under appropriate processing conditions to provide well defined nanostructures.

BRIEF SUMMARY OF THE INVENTION

The invention provides a diblock copolymer of the formula (I):

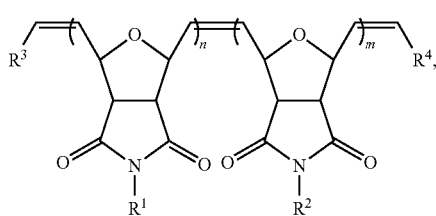

wherein:

$R^1$ is a poly(alkyleneoxide) group of the formula, —(CHR—CH$_2$—O)$_p$—R', wherein p=2-6, R is H or methyl, and R' is H, a $C_1$-$C_6$ alkyl group, or a $C_3$-$C_{11}$ cycloalkyl group;

$R^2$ is a $C_6$-$C_{20}$ aryl group, optionally substituted with a substituent selected from halo, alkoxy, alkylcarbonyl, alkoxycarbonyl, amido, and nitro;

one of $R^3$ and $R^4$ is a $C_6$-$C_{14}$ aryl group or a heteroaryl group, optionally substituted with a substituent selected from hydroxy, halo, amino, and nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl;

n and m are independently 2 to about 2000.

The invention also provides a process for preparing the diblock copolymer of formula (I) and porous membranes prepared from the diblock copolymers.

DETAILED DESCRIPTION OF THE INVENTION

Figure 1:
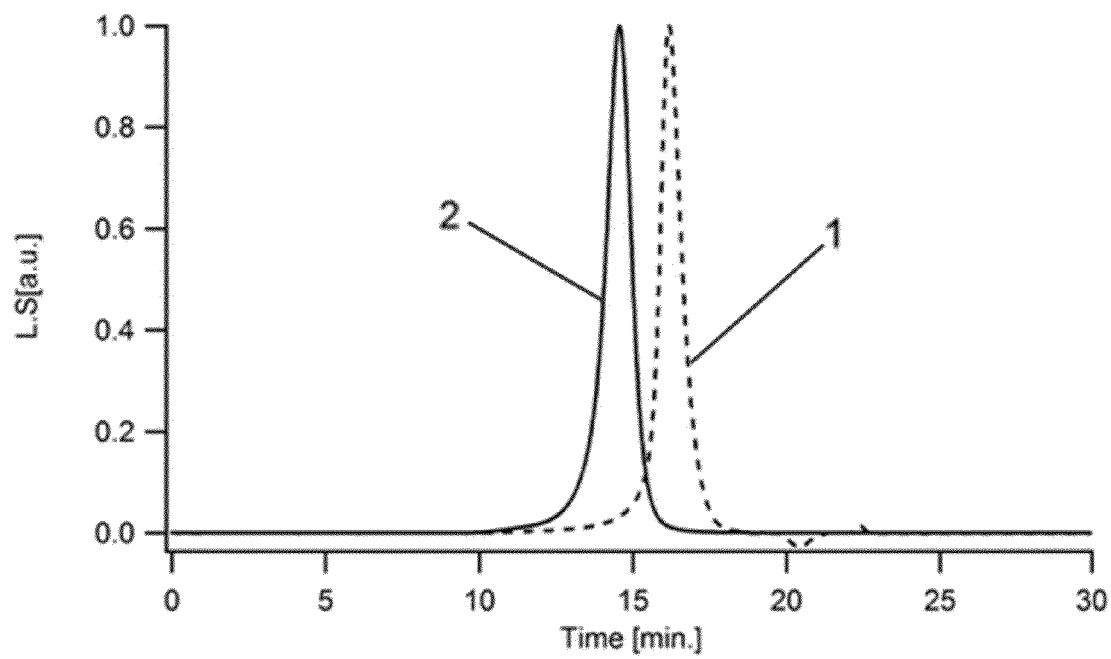
FIG. 1 depicts the overlaid traces of the Multi-angle Laser Light Scattering (MALS) gel permeation chromatograms (GPC) of a homopolymer 1 (a precursor to the diblock copolymer) and a diblock copolymer 2 in accordance with an embodiment of the invention.

In an embodiment, the invention provides a diblock copolymer of the formula (I):

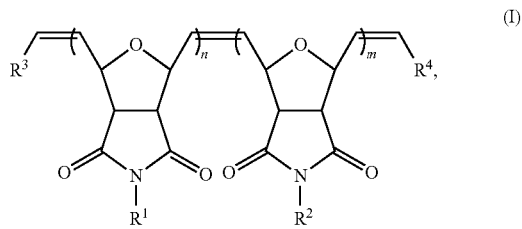

wherein:

$R^1$ is a poly(alkyleneoxide) group of the formula, —(CHR—CH$_2$—O)$_p$—R', wherein p=2-6, R is H or methyl, and R' is H, a $C_1$-$C_6$ alkyl group, or a $C_3$-$C_{11}$ cycloalkyl group;

$R^2$ is a $C_6$-$C_{20}$ aryl group, optionally substituted with a substituent selected from halo, alkoxy, alkylcarbonyl, alkoxycarbonyl, amido, and nitro;

one of $R^3$ and $R^4$ is a $C_6$-$C_{14}$ aryl group or a heteroaryl group, optionally substituted with a substituent selected from hydroxy, halo, amino, and nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl;

n and m are independently 2 to about 2000.

In accordance with an embodiment, the invention provides a diblock copolymer of the formula (Ia), where the monomers are exo isomers:

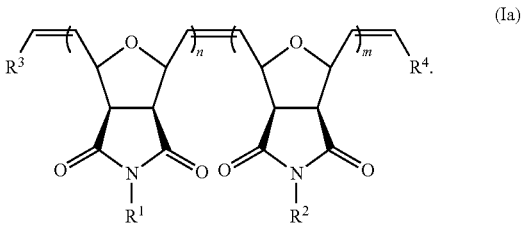

In any of the embodiments above, R is H.

In an embodiment, p is 3-6.

In any of the embodiments, R' is a $C_1$-$C_6$ alkyl group, preferably methyl.

In any of the embodiments above, $R^2$ is a $C_6$-$C_{10}$ aryl group, optionally substituted with a substituent selected from hydroxy, nitro, amino, halo, alkoxy, alkylcarbonyl, alkoxycarbonyl, amido, and nitro.

In an embodiment, $R^2$ is a phenyl group, optionally substituted with a substituent selected from hydroxy, nitro, amino, halo, alkoxy, alkylcarbonyl, alkoxycarbonyl, amido, and nitro.

In any of the embodiments above, $R^3$ is a $C_6$-$C_{14}$ aryl group, optionally substituted with a substituent selected from hydroxy, halo, amino, and nitro and $R^4$ is a $C_1$-$C_{22}$ alkoxy group, optionally substituted with a substituent selected from carboxy, amino, mercapto, alkynyl, alkenyl, halo, azido, and heterocyclyl.

In an embodiment, $R^3$ is phenyl, optionally substituted with a substituent selected from hydroxy, halo, amino, and nitro and $R^4$ is a $C_1$-$C_6$ alkoxy group, optionally substituted with a substituent selected from carboxy, amino, mercapto, alkynyl, alkenyl, halo, azido, and heterocyclyl.

In an embodiment, $R^3$ is provided by the ROMP catalyst employed for the polymerization of the monomers.

In an embodiment, $R^4$ is a group provided by the vinyl ether compound employed for terminating the polymerization.

In accordance with the invention, the term "aryl" refers to a mono, bi, or tricyclic carbocyclic ring system having one, two, or three aromatic rings, for example, phenyl, naphthyl, anthracenyl, or biphenyl. The term "aryl" refers to an unsubstituted or substituted aromatic carbocyclic moiety, as commonly understood in the art, and includes monocyclic and polycyclic aromatics such as, for example, phenyl, biphenyl, naphthyl, anthracenyl, pyrenyl, and the like. An aryl moiety generally contains from, for example, 6 to 30 carbon atoms, preferably from 6 to 18 carbon atoms, more preferably from 6 to 14 carbon atoms and most preferably from 6 to 10 carbon atoms. It is understood that the term aryl includes carbocyclic moieties that are planar and comprise $4n+2\pi$ electrons, according to Hückel's Rule, wherein n=1, 2, or 3.

In accordance with the invention, the term "heteroaryl" refers to a cyclic aromatic radical having from five to ten ring atoms of which at least one atom is O, S, or N, and the remaining atoms are carbon. Examples of heteroaryl radicals include pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, and isoquinolinyl. The term "heteroaryl" as used herein, means a monocyclic heteroaryl or a bicyclic heteroaryl. The monocyclic heteroaryl is a five- or six-membered ring. The five-membered ring consists of two double bonds and one sulfur, nitrogen or oxygen atom. Alternatively, the five-membered ring has two double bonds and one, two, three or four nitrogen atoms and optionally one additional heteroatom selected from oxygen or sulfur, and the others carbon atoms. The six-membered ring consists of three double bonds, one, two, three or four nitrogen atoms, and the others carbon atoms. The bicyclic heteroaryl consists of a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl. The monocyclic and the bicyclic heteroaryl are connected to the parent molecular moiety through any substitutable atom contained within the monocyclic or the bicyclic heteroaryl. The monocyclic and bicyclic heteroaryl groups of the present invention can be substituted or unsubstituted. In addition, the nitrogen heteroatom may or may not be quaternized, and may or may not be oxidized to the N-oxide. Also, the nitrogen containing rings may or may not be N-protected. Representative examples of monocyclic heteroaryl include, but are not limited to, furanyl, imidazolyl, isoxazolyl, isothiazolyl, oxadiazolyl, oxazolyl, pyridinyl, pyridine-N-oxide, pyridazinyl, pyrimindinyl, pyrazinyl, pyrazolyl, pyrrolyl, tetrazolyl, thiadiazolyl, thiazolyl, thienyl, triazolyl, and triazinyl. Representative examples of bicyclic heteroaryl groups include, but not limited to, benzothienyl, benzoxazolyl, benzimidazolyl, benzoxadiazolyl, 6,7-dihydro-1,3-benzothiazolyl, imidazo[1,2-a]pyridinyl, indazolyl, 1H-indazol-3-yl, indolyl, isoindolyl, isoquinolinyl, naphthyridinyl, pyridoimidazolyl, quinolinyl, quinolin-8-yl, and 5,6,7,8-tetrahydroquinolin-5-yl.

The "alkyl" group could be linear or branched. In accordance with an embodiment, the alkyl group is preferably a $C_1$-$C_6$ alkyl. Examples of alkyl group include methyl, ethyl, n-propyl, isopropyl, n-butyl, sec-butyl, isobutyl, tert-butyl, n-pentyl, isopentyl, n-hexyl, and the like. This definition also applies wherever "alkyl" occurs such as in hydroxyalkyl, monohalo alkyl, dihalo alkyl, and trihalo alkyl. The alkyl group can also be further substituted with a cycloalkyl group, e.g., a $C_3$-$C_{11}$ cycloalkyl group.

In any of the above embodiments, the "cycloalkyl" group can be monocyclic or bicyclic. Examples of monocyclic cycloalkyl groups include cyclopropyl, cyclobutyl, cyclopentyl, cyclohexyl, cycloheptyl, and cyclooctyl. Examples of bicyclic cycloalkyl groups include those with one common ring carbon atom such as spirooctane, spirononane, spirodecane, and spiroundecane, and those with two common ring carbon atoms such as bicyclooctane, bicyclononane, bicyclodecane, and bicycloundecane. Any of the cycloalkyl groups could be optionally substituted with one or more alkyl groups, e.g., $C_1$-$C_6$ alkyl groups.

In accordance with an embodiment, the "alkoxy" group is preferably a $C_1$-$C_{22}$ alkoxy. Examples of alkoxy group include methoxy, ethoxy, n-propoxy, isopropoxy, n-butoxy, sec-butoxy, isobutoxy, tert-butoxy, n-pentoxy, isopentoxy, n-hexoxy, hexadecyloxy, and the like.

The term "halo" refers to a halogen selected from the group consisting of fluorine, chlorine, bromine, and iodine, preferably chlorine or bromine.

The term "heterocycle" or "heterocyclic" as used herein, means a monocyclic heterocycle or a bicyclic heterocycle. The monocyclic heterocycle is a three-, four-, five-, six- or seven-membered ring containing at least one heteroatom independently selected from the group consisting of O, N, N(H) and S. The three- or four-membered ring contains zero or one double bond and a heteroatom selected from the group consisting of O, N, N(H) and S. The five-membered ring contains zero or one double bond, and one, two or three heteroatoms selected from the group consisting of O, N, N(H) and S. The six-membered ring contains zero, one or two double bonds and one, two or three heteroatoms selected from the group consisting of O, N, N(H) and S. The seven-membered ring contains zero, one, two, or three double bonds and one, two or three heteroatoms selected from the group consisting of O, N, N(H) and S. The monocyclic heterocycle can be unsubstituted or substituted and is connected to the parent molecular moiety through any substitutable carbon atom or any substitutable nitrogen atom contained within the monocyclic heterocycle. Representative examples of monocyclic heterocycle include, but are not limited to, azetidinyl, azepanyl, aziridinyl, diazepanyl, [1,4]diazepan-1-yl, 1,3-dioxanyl, 1,3-dioxolanyl, 1,3-dithiolanyl, 1,3-dithianyl, homomorpholinyl, homopiperazinyl, imidazolinyl, imidazolidinyl, isothiazolinyl, isothiazolidinyl, isoxazolinyl, isoxazolidinyl, morpholinyl, oxadiazolinyl, oxadiazolidinyl, oxazohnyl, oxazolidinyl, piperazinyl, piperidinyl, pyranyl, pyrazolinyl, pyrazolidinyl, pyrrolinyl, pyrrolidinyl, tetrahydrofuranyl, tetrahydropyranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, a monocyclic heterocycle fused to a monocyclic heterocycle, or a monocyclic heterocycle fused to a monocyclic heteroaryl. The bicyclic heterocycle is connected to the parent molecular moiety through any substitutable carbon atom or any substitutable nitrogen atom contained within the bicyclic heterocycle and can be unsubstituted or substituted. Representative examples of bicyclic heterocycle include, but are not limited to, benzodioxinyl, benzopyranyl, thiochromanyl, 2,3-dihydroindolyl, indolizinyl, pyranopyridinyl, 1,2,3,4-tetrahydroisoquinolinyl, 1,2,3,4-tetrahydroquinolinyl, thiopyranopyridinyl, 2-oxo-1,3-benzoxazolyl, 3-oxo-benzoxazinyl, 3-azabicyclo[3.2.0]heptyl, 3,6-diazabicyclo[3.2.0]heptyl, octahydrocyclopenta[c]pyrrolyl, hexahydro-1H-furo[3,4-c]pyrrolyl, octahydropyrrolo[3,4-c]pyrrolyl, 2,3-dihydrobenzofuran-7-yl, 2,3-dihydrobenzofuran-3-yl, and 3,4-dihydro-2H-chromen-4-yl. The monocyclic or bicyclic heterocycles as defined herein may have two of the non-adjacent carbon atoms connected by a heteroatom selected from N, N(H), O or S, or an alkylene bridge of between one and three additional carbon atoms. Representative examples of monocyclic or bicyclic heterocycles that contain such connection between two non-adjacent carbon atoms include, but not limited to, 2-azabicyclo[2.2.2]octyl, 2-oxa-5-azabicyclo[2.2.2]octyl, 2,5-diazabicyclo[2.2.2]octyl, 2-azabicyclo[2.2.1]heptyl, 2-oxa-5-azabicyclo[2.2.1]heptyl, 2,5-diazabicyclo[2.2.1]heptyl, 2-azabicyclo[2.1.1]hexyl, 5-azabicyclo[2.1.1]hexyl, 3-azabicyclo[3.1.1]heptyl, 6-oxa-3-azabicyclo[3.1.1]heptyl, 8-azabicyclo[3.2.1]octyl, 3-oxa-8-azabicyclo[3.2.1]octyl, 1,4-diazabicyclo[3.2.2]nonyl, 1,4-diazatricyclo[4.3.1.1 3,8]undecyl, 3,10-diazabicyclo[4.3.1]decyl, or 8-oxa-3-azabicyclo[3.2.1]octyl, octahydro-1H-4,7-methanoisoindolyl, and octahydro-1H-4,7-epoxyisoindolyl. The nitrogen heteroatom may or may not be quaternized, and may or may not be oxidized to the N-oxide. In addition, the nitrogen containing heterocyclic rings may or may not be N-protected.

Examples of heterocyclyl groups include pyridyl, piperidinyl, piperazinyl, pyrazinyl, pyrolyl, pyranyl, tetrahydropyranyl, tetrahydrothiopyranyl, pyrrolidinyl, furanyl, tetrahydropyranyl, thiophenyl, tetrahydrothiophenyl, purinyl, pyrimidinyl, thiazolyl, thiazolidinyl, thiazolinyl, oxazolyl, triazolyl, tetrazolyl, tetrazinyl, benzoxazolyl, morpholinyl, thiophorpholinyl, quinolinyl, and isoquinolinyl.

Five-membered unsaturated heterocyclics with and without benzo: furanyl, thiopheneyl, pyrrolyl, pyrazolyl, pyrazolinyl, imidazolyl, imidazolinyl, dithiazolyl, furazanyl, 1,2,3-triazolyl, tetrazolyl, 1,2,4-triazolyl, oxadiazolyl, thiadiazolyl, isoxazolyl, isoxazolinyl, oxazolyl, oxazolinyl, phospholyl, isothiazolyl, thiazolyl, thiazolinyl, isothiazolyl, isothiazolidinyl, benzofuranyl, benzothiopheneyl, indolyl, benzimidazolyl, benzoxazolinyl, and benzothiazolinyl.

Whenever a range of the number of atoms in a structure is indicated (e.g., a $C_{1-22}$, a $C_{1-12}$, $C_{1-8}$, $C_{1-6}$, or $C_{1-4}$ alkyl, alkoxy, etc.), it is specifically contemplated that any subrange or individual number of carbon atoms falling within the indicated range also can be used. Thus, for instance, the recitation of a range of 1-22 carbon atoms (e.g., $C_1$-$C_{22}$), 1-20 carbon atoms (e.g., $C_1$-$C_{20}$), 1-18 carbon atoms (e.g., $C_1$-$C_{20}$), 1-16 carbon atoms (e.g., $C_1$-$C_{16}$), 1-14 carbon atoms (e.g., $C_1$-$C_{14}$), 1-12 carbon atoms (e.g., $C_1$-$C_{12}$), 1-10 carbon atoms (e.g., $C_1$-$C_{10}$), 1-8 carbon atoms (e.g., $C_1$-$C_8$), 1-6 carbon atoms (e.g., $C_1$-$C_6$), 1-4 carbon atoms (e.g., $C_1$-$C_4$), 1-3 carbon atoms (e.g., $C_1$-$C_3$), or 2-8 carbon atoms (e.g., $C_2$-$C_8$) as used with respect to any chemical group (e.g., alkyl, alkoxy, alkylamino, etc.) referenced herein encompasses and specifically describes 1, 2, 3, 4, 5, 6, 7, 8, 9, 10, 11, 12, 13, 14, 15, 16, 17, 18, 19, 20, 21, or 22 carbon atoms, as appropriate, as well as any sub-range thereof, e.g., 1-2 carbon atoms, 1-3 carbon atoms, 1-4 carbon atoms, 1-5 carbon atoms, 1-6 carbon atoms, 1-7 carbon atoms, 1-8 carbon atoms, 1-9 carbon atoms, 1-10 carbon atoms, 1-11 carbon atoms, 1-12 carbon atoms, 1-13 carbon atoms, 1-14 carbon atoms, 1-15 carbon atoms, 1-16 carbon atoms, 1-17 carbon atoms, 1-18 carbon atoms, 1-19 carbon atoms, 1-20 carbon atoms, 1-21 carbon atoms, and 1-22 carbon atoms, and anything in between such as 2-3 carbon atoms, 2-4 carbon atoms, 2-5 carbon atoms, 2-6 carbon atoms, 2-7 carbon atoms, 2-8 carbon atoms, 2-9 carbon atoms, 2-10 carbon atoms, 2-11 carbon atoms, 2-12 carbon atoms, 2-12 carbon atoms, 2-13 carbon atoms, 2-14 carbon atoms, 2-15 carbon atoms, 2-16 carbon atoms, 2-17 carbon atoms, 2-18 carbon atoms, 2-19 carbon atoms, 2-20 carbon atoms, 2-21 carbon atoms, and 2-22 carbon atoms, 3-4 carbon atoms, 3-5 carbon atoms, 3-6 carbon atoms, 3-7 carbon atoms, 3-8 carbon atoms, 3-9 carbon atoms, 3-10 carbon atoms, 3-11 carbon atoms, 3-12 carbon atoms, 3-13 carbon atoms, 3-14 carbon atoms, 3-15 carbon atoms, 3-16 carbon atoms, 3-17 carbon atoms, 3-18 carbon atoms, 3-19 carbon atoms, 3-20 carbon atoms, 3-21 carbon atoms, and 3-22 carbon atoms, and 4-5 carbon atoms, 4-6 carbon atoms, 4-7 carbon atoms, 4-8 carbon atoms, 4-9 carbon atoms, 4-10 carbon atoms, 4-11 carbon atoms, 4-12 carbon atoms, 4-13 carbon atoms, 4-14 carbon atoms, 4-15 carbon atoms, 4-16 carbon atoms, 4-17 carbon atoms, 4-18 carbon atoms, 4-19 carbon atoms, 4-20 carbon atoms, 4-21 carbon atoms, 4-22 carbon atoms, etc., as appropriate.

In the above embodiments, "n" and "m" represent the average degree of polymerization of the respective monomers.

In accordance with embodiments of the invention, n is about 10 to about 1000, about 10 to about 500, about 10 to about 250, about 20 to about 1000, about 20 to about 500, about 20 to about 250, about 30 to about 1000, about 30 to about 500, about 30 to about 250, about 40 to about 1000, about 40 to about 500, about 40 to about 250, about 50 to about 1000, about 50 to about 500, about 50 to about 250, about 60 to about 1000, about 60 to about 500, or about 60 to about 250.

In any of the above embodiments, m is about 50 to about 2000, about 50 to about 1500, about 50 to about 1000, about 100 to about 2000, about 100 to about 1500, about 100 to about 1000, about 150 to about 2000, about 150 to about 1500, about 150 to about 1000, about 200 to about 2000, about 200 to about 1500, or about 200 to about 1000.

In any of the above embodiments of the diblock copolymer, n is typically about 30 to about 350, preferably about 70 to about 200, and more preferably about 100 to about 150.

In any of the above embodiments, m is typically about 150 to about 1775, preferably about 350 about 1000, and more preferably about 500 to about 750.

The diblock copolymer can have any suitable total molecular weight, for example, a number average molecular weight ($M_n$) of from about 40 kDa to about 500 kDa; in certain embodiments, the diblock copolymer has an $M_n$ of from about 75 kDa to about 300 kDa; in certain other embodiments, the diblock copolymer has an $M_n$ of about 250 kDa. In an embodiment, the diblock copolymer has an $M_n$ of 233 kDa.

The carbon-carbon double bonds in the diblock copolymer can have any suitable orientation, cis, trans, and they can be distributed in a random manner.

The diblock copolymer may self-assemble into a nanostructure of any suitable morphology, for example, but not limited to, spherical or body centered cubic morphology, cylindrical morphology, lamellar morphology, or double gyroid morphology. The type of nanostructure into which the copolymers self-assemble would depend, among others, on the volume fraction of the two blocks in the block copolymer as well as the nature of the solvent system.

For example, at a polymer volume fraction ratio range ($f_A$:$f_B$) of the two monomers of 37-50:63-50, formation of a lamellar morphology involving a stack of layers of equivalent domain size is favored, at a volume fraction ratio range of 15-70:85-30, formation of a cylindrical morphology where the minor polymer component forms cylinders in a matrix of major polymer block component is favored, and at a volume fraction ratio range of 7-15:83-85, formation of spherical morphology or body centered cubic (bcc) morphology where the minor polymer component forms spheres in a matrix of the major polymer block component is favored. At a volume fraction ratio range of 33-37:67-33, formation of a double gyroid morphology is favored.

Cylindrical morphology includes a phase domain morphology having discrete tubular or cylindrical shapes. The tubular or cylindrical shapes may be hexagonally packed on a hexagonal lattice. In embodiments, the cylindrical domain size is from about 5 nm to about 100 nm.

Lamellar morphology includes a phase domain morphology having layers of alternating compositions that are generally oriented parallel with respect to one another. In embodiments, the lamellar domain size is from about 5 nm to about 100 nm.

The double gyroid morphology comprises two interpenetrating continuous network. In embodiments, the double gyroid domain size is from about 5 nm to about 100 nm.

Spherical morphology or bcc morphology refers to a phase domain morphology having spherical domains of one block arranged on a body centered cubic lattice in a matrix of the second block. In embodiments, the spherical morphology domain size is from about 5 nm to about 100 nm.

In an embodiment, the polymerized second monomer (bearing $R^2$) and the polymerized first monomer (bearing $R^1$) are present in the diblock copolymer in any suitable volume fraction. For example, the % volume fraction of the first monomer to that of the second monomer can be in the range of from about 15:about 85 to about 30:about 70, preferably in the range of from about 19:about 81 to about 25:about 75, and more preferably about 20:about 80. In an embodiment, the volume fraction of the second monomer is about 78%, and the mass fraction is 77.4%, of the total polymer.

In an embodiment, the volume fraction of the second monomer to that of the first monomer is about 3.5:1, which favors the formation of cylindrical morphology. The mass fraction of the second monomer to that of the first monomer is about 3.4:1.

In a specific embodiment, the diblock copolymer of formula (I) has the following structure, in particular, wherein n is 150 and m is 675:

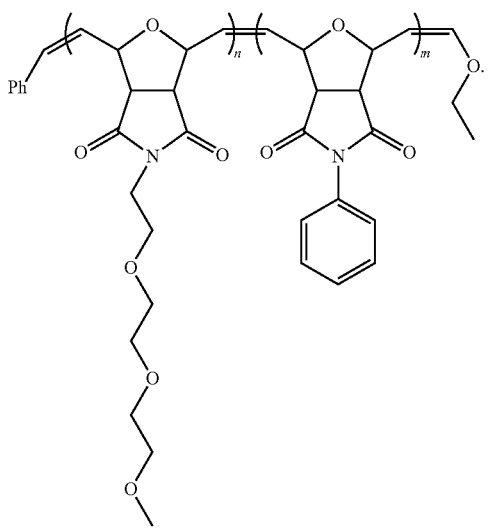

In an embodiment, the diblock copolymer of formula (I) has the following structure where the monomers are in the exo configuration, in particular, wherein n is 150 and m is 675:

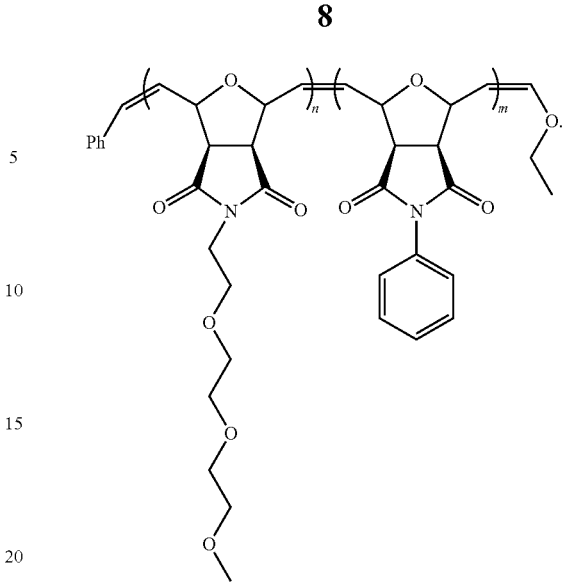

The present invention further provides a method of preparing diblock copolymers of formula (I) described above, comprising:

(i) polymerizing one of the two monomers of the formulas:

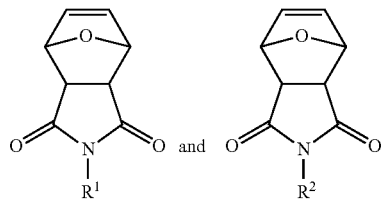

with a ring opening metathesis polymerization (ROMP) catalyst to obtain a ring-opened polymer having a living chain end;

(ii) polymerizing the other of the two monomers on the living end of the ring-opened polymer obtained in (i) to obtain a diblock copolymer having a living end; and (iii) terminating the living end of the diblock copolymer obtained in (ii) with an optionally substituted alkyl vinyl ether.

The alkyl group of the alkyl vinyl ether could be optionally substituted with a substituent, for example, a substituent selected from hydroxy, halo, amino, and nitro.

In an embodiment of the above method, the monomer that is first polymerized is of the formula:

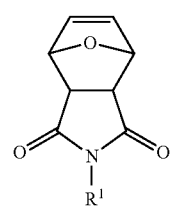

After the polymerization of the above monomer, the second monomer that is polymerized thereon is a monomer of the formula:

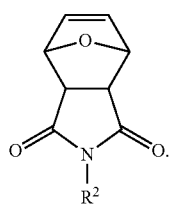

The first monomer and the second monomer can be an exo or endo stereochemical configuration. In an embodiment, the first and second monomers are of the exo configuration, e.g., a monomer having the exo isomer at 98% or higher.

In the first and second monomers, $R^1$ and $R^2$ are the same as described above for the diblock copolymer of formula (I). The first and second monomers are (oxa)norbornene (di)carboxylic imide derived monomers. The monomers can be prepared by any suitable method, for example, starting from maleimide and furan via a Diels-Alder reaction, illustrated below:

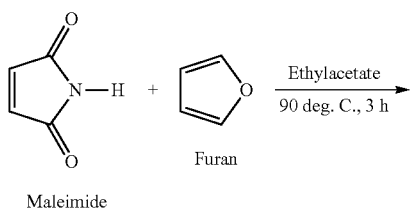

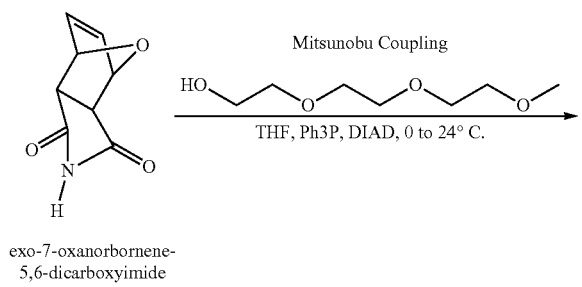

The first monomer can be synthesized via Mitsunobu Coupling reaction, as illustrated below:

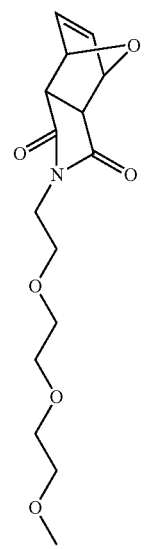

exo-7-oxanorbornene-N-triethyleneglycol monomethylether-5,6-dicarboxyimide

Alternatively, the first monomer can be synthesized by the reaction of N-triethyleneglycol monomethylethermaleimide with furan via a Diels-Alder reaction.

The second monomer can be synthesized via a Diels-Alder reaction between N-phenyl maleimide and furan in acetonitrile, as illustrated below.

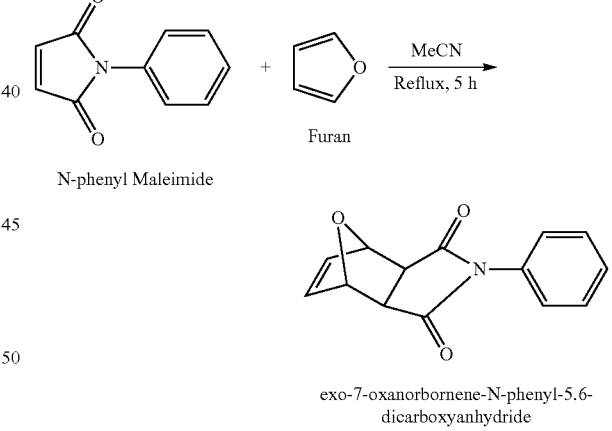

The polymerization of the monomers is carried out by ring-opening olefin metathesis polymerization (ROMP), in which a cyclic olefin monomer is polymerized or copolymerized by ring-opening of the cyclic olefin monomer. Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

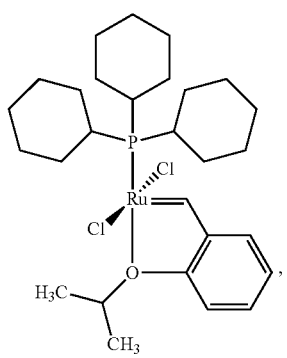
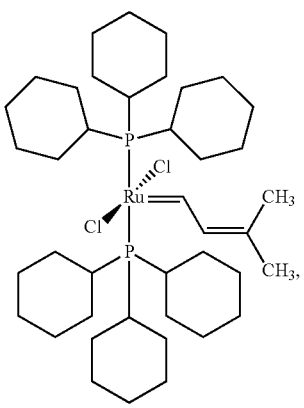
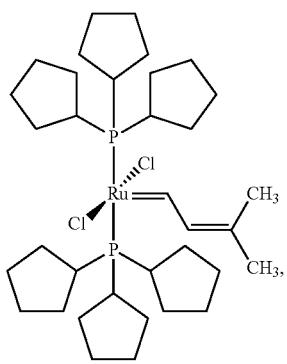
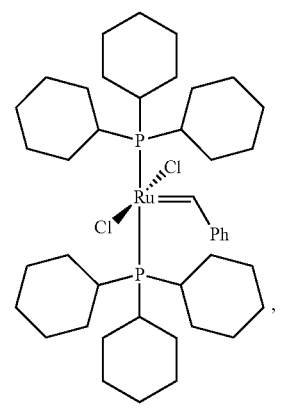
-continued
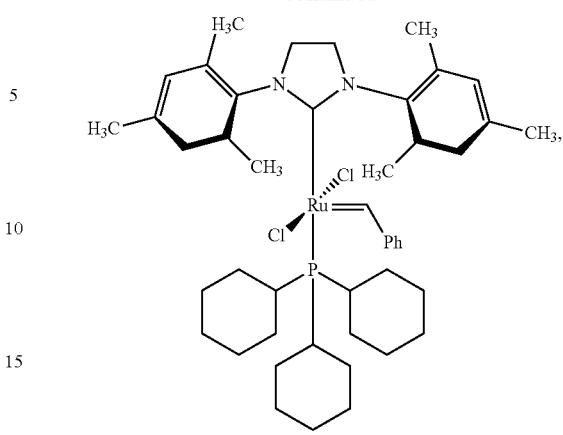
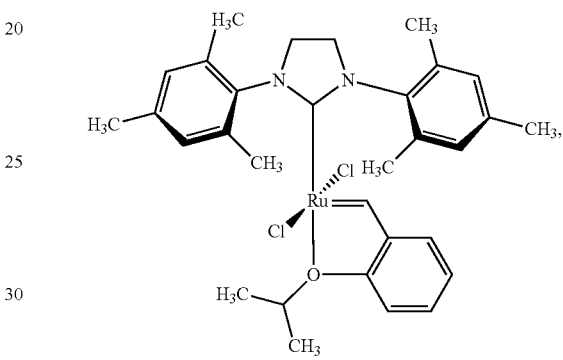
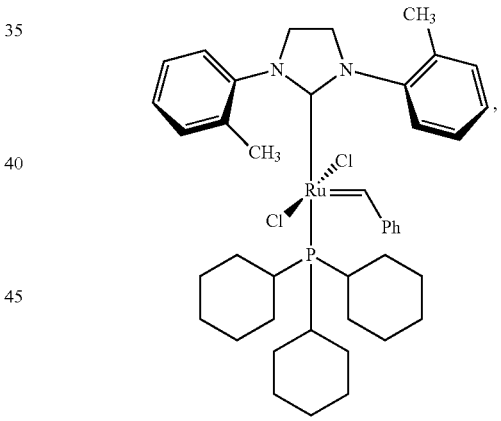
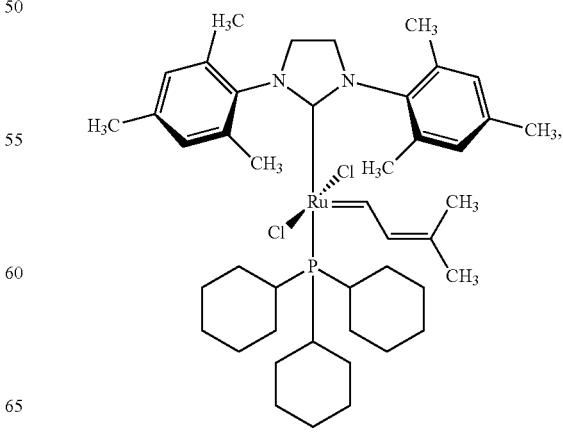

-continued
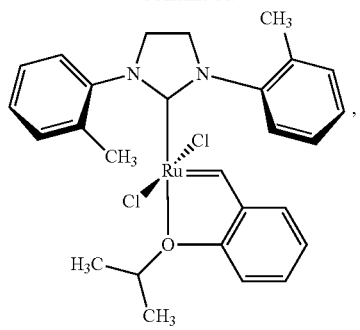
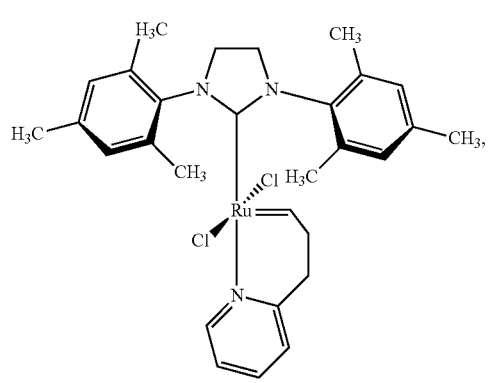
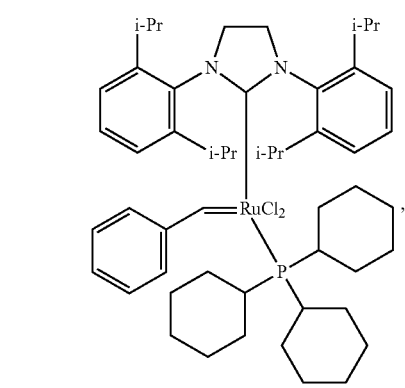
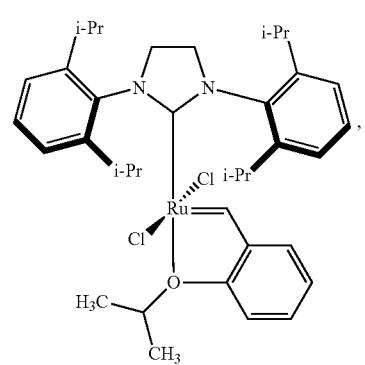
-continued
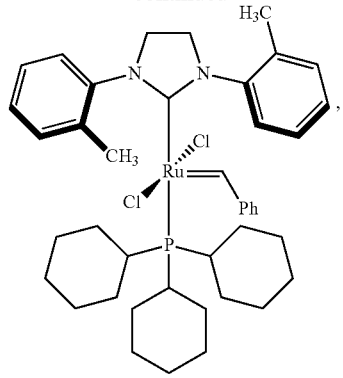
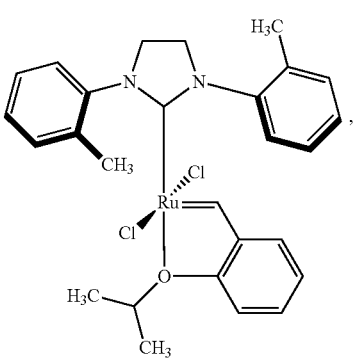
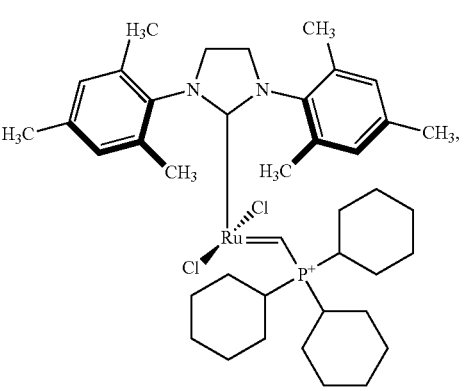
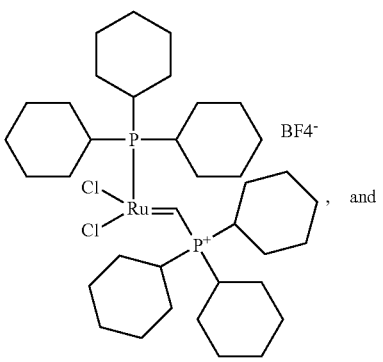
and -continued

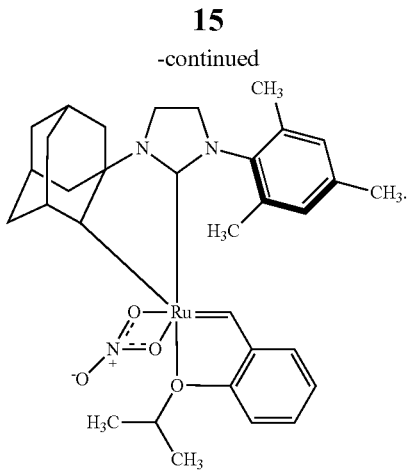

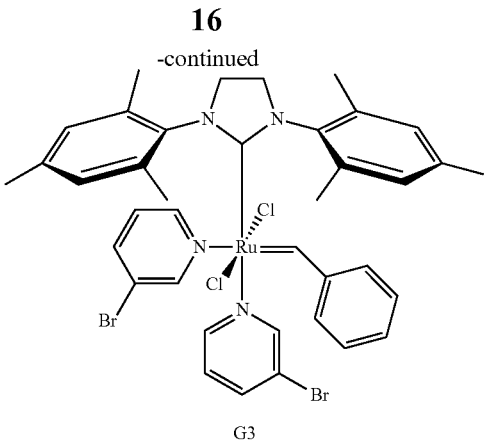

G3

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. An example of such a catalyst is:

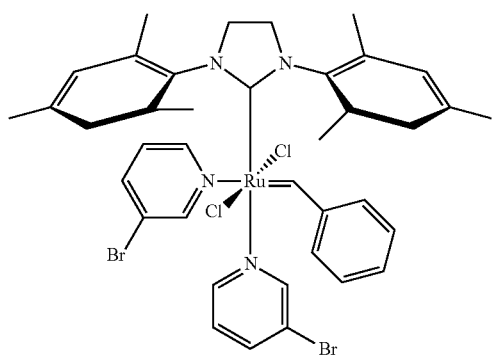

The above third generation Grubbs catalyst may be obtained commercially or prepared from a Grubbs second generation catalyst (G2) as follows:

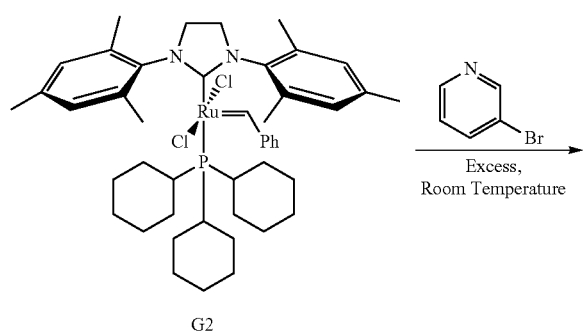

The first monomer and the second monomer are polymerized sequentially to obtain the diblock copolymer. In accordance with the invention, any one of the two monomers can be polymerized. For example, the first monomer can be polymerized first, followed by the second monomer. Alternatively, the second monomer can be polymerized first, followed by the first monomer.

Typically, the monomers have a chemical purity of at least 95%, preferably 99% or greater, and more preferably 99.9% or greater. It is preferred that the monomers are free of impurities that will interfere with the polymerization, e.g., impurities that will affect the ROMP catalyst. Examples of such impurities include amines, thiols, acids, phosphines, and N-substituted maleimides.

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

The polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to the monomer can be about 1:10 to about 1:1000, preferably about 1:50 to about 1:500, and more preferably about 1:100 to about 1:200. For example, the molar ratio of the catalyst to the monomer could be 1:n and 1:m, where n and m are the average degrees of polymerization.

After the polymerization of the two monomers, the chain end of the diblock copolymer is terminated by adding an optionally substituted alkyl vinyl ether to the polymerization mixture.

The diblock copolymer can be isolated by a suitable technique such as precipitation with a nonsolvent.

The homopolymer formed during the preparation of the diblock copolymer and the diblock copolymer of the invention can be characterized for its molecular weight and molecular weight distribution by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The diblock copolymers of the invention are highly monodisperse. For example, the copolymers have an Mw/Mn of 1.01 to 1.2, preferably 1.05 to 1.10.

The present invention further provides a porous membrane comprising a diblock copolymer described above. The diblock copolymer can be dissolved in a suitable solvent system. For example, the solvent system includes a solvent or a mixture of solvents selected from dichloromethane, 1-chloropentane, chloroform, 1,1-dichloroethane, N,N-dimethylformamide (DMF), N,N-dimethylacetamide (DMA), N-methylpyrrolidone (NMP), dimethylsulfoxide (DMSO), tetrahydrofuran (THF), 1,3-dioxane, and 1,4-dioxane.

Figure 2:
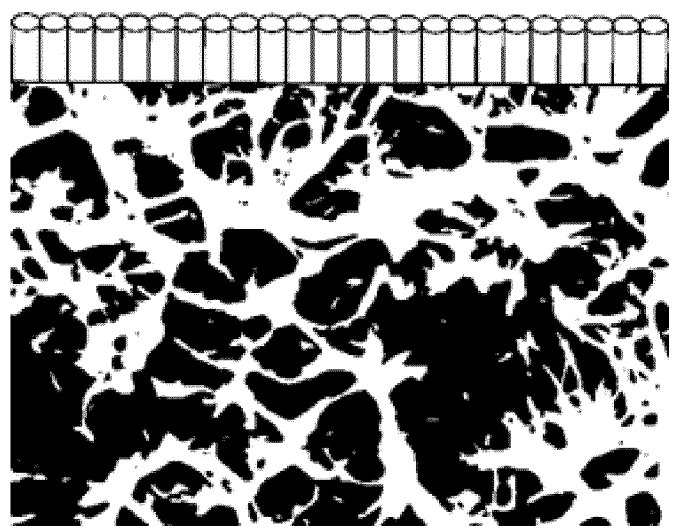
FIG. 2 illustrates a porous membrane comprising a diblock copolymer in accordance with an embodiment of the invention.

The polymer solution is cast as a thin film on a suitable substrate by any suitable method, for example, spin coating, hybrid casting, or spray coating. For example, in hybrid casting, the solvent is allowed to evaporate from the thin film so that the diblock copolymer undergoes self-assembly. The coating which contains an ordered nanostructure is allowed to undergo phase inversion by immersing it in a nonsolvent such as isopropanol, pentane, or hexane, or a mixture containing isopropanol, DMSO, and/or water. The cross-section of a membrane according to an embodiment of the invention is depicted as an illustrative diagram in FIG. 2 and is characterized by a thin nanoporous layer at the top where the copolymer assumes a cylindrical morphology, which is supported by a porous polymer layer of random morphology.

Figure 3:
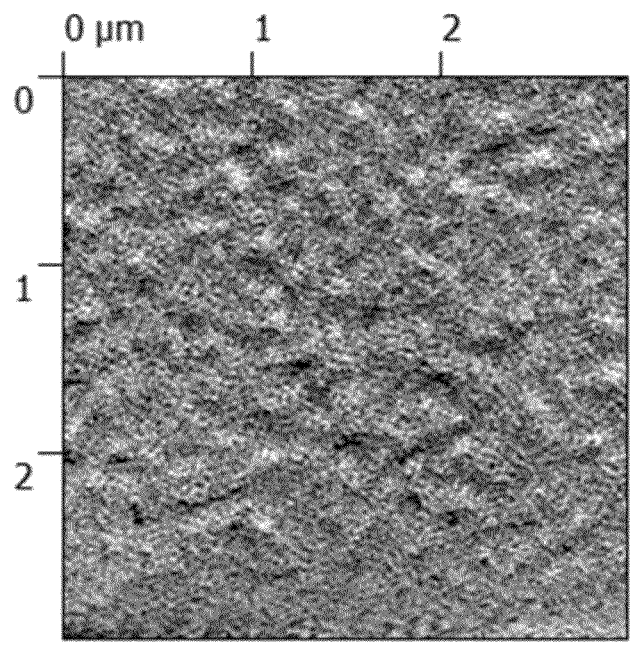
FIG. 3 depicts an Atomic Force Microscopy (AFM) phase image of a self-assembled structure prepared in accordance with an embodiment of the invention.

Alternatively, the polymer solution can be spin coated on a substrate such as glass plate or silicon wafer. The wet film is annealed in a solvent vapor, e.g., dichloromethane vapor, for a period of about 1 hr to about 16 hr or more in order for the polymer to self-assemble into an ordered structure. FIG. 3 depicts an AFM phase image of the self-assembled structure.

A porous membrane can be prepared from the self-assembled structure via confined swelling leading to the generation of pores. Confined swelling is effected by an annealing step, which could be carried out either by exposing the self-assembled structure to a solvent vapor or by soaking in a liquid solvent.

A porous structure can be generated from the self-assembled structure, particularly one with cylindrical morphology, via a confined swelling step, which is carried by annealing. The annealing step could be done in either a solvent vapor or soaking in liquid solvent. The solvent should be a good solvent for the minor volume fraction block that forms the cylinder core and non-solvent for the major volume block forming the matrix. While not intending to be held to any theory or mechanism, it is believed that, as the self-assembled structure is annealed the cylinder core becomes swollen by the solvent, leading to an increase of the cylinder volume. As the cylinder cores spread outside the matrix surface, the spreading forces the cylinders to create pores. The matrix thickness also increases.

Examples of solvents that can be used for the annealing include tetrahydrofuran (THF), butylacetate, ethylacetate, methylethylketone, and acetone. The solvent or mixture of solvents can be at any suitable temperature, for example, from ambient temperature, for example, 20° C. to 25° C., to elevated temperatures, such as up to 40° C., 50° C., 60° C., 70° C., 80° C., or 90° C.

In accordance with an embodiment of the invention, the porous membrane is a nanoporous membrane, for example, a membrane having pores of diameter between 1 nm and 100 nm.

Membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the membrane can have a variety of configurations, including planar, flat sheet, pleated, tubular, spiral, and hollow fiber.

Membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The following examples further illustrate the invention but, of course, should not be construed as in any way limiting its scope.

Example 1

This example provides the materials used in the preparation of the monomers and polymers.

Maleimide, furan, diisopropylazodicarboxylate (DIAD), triphenylphosphine ($Ph_3P$), 1-hexadecanol, tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use.

Example 2

This example illustrates the preparation of exo-7-oxanorbomene-5,6-dicarboxyimide (C1), an intermediate in the preparation of the first and second monomers in accordance with an embodiment of the invention.

In a clean 500 mL round bottom flask (RBF) equipped with magnetic stifling bar, furan (21.0 g, 309 mmol) was added to a solution of maleimide (25 g, 258 mmol) in 250 mL of ethyl acetate. The mixture was heated at 90° C. for 30 h. C1 was obtained as white precipitate from solution upon washing with ether (100 mL, 3×) and filtration. The white solid was dried under vacuum at room temperature for 24 h. C1 was obtained as a pure exo-isomer in yield of 29 g, 68%. $^1$H-NMR (300 MHz, $CDCl_3$): δ (ppm) 8.09 (s, 1H), 6.53 (s, 2H), 5.32 (s, 2H), 2.89 (s, 2H).

Example 3

This example illustrates the preparation of dichloro[1,3-bis(2,4,6-trimethylphenyl)-2-imidazolidinylidene](benzylidene)bis(3-bromopyridine)ruthenium(II) (G3) catalyst.

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

Example 4

This example illustrates the preparation of a first monomer in accordance with an embodiment of the invention, exo-7-oxanorbornene-N-triethyleneglycolmonemethylether-5,6-dicarboxyimide).

A 1 L round-bottom flask was charged with exo-7-oxanorbomene-5,6-dicarboxyimide (82.6 g; 0.5 mol), triethyleneglycol monomethyl ether (70.4 mL; 0.45 mol) and triphenylphosphine (144.3 g; 0.55 mol). The contents were vigorously stirred with anhydrous tetrahydrofuran (650 mL) until all the solids dissolved. The mixture was cooled in an ice-bath, followed by the drop-wise addition of diethyl azodicarboxylate (87 mL; 0.55 mol) diluted with anhydrous tetrahydrofuran (50 mL), while maintaining vigorous stirring and ice cooling. The reaction mixture was allowed to slowly warm up to ambient temperature and stirring continued for 24-48 h. Tetrahydrofuran was removed by rotary evaporation and the concentrate was diluted with diethyl ether (1 L) and the resulting slurry was stirred at the ambient temperature for 4 h. The insoluble solids were filtered off, washed with diethyl ether (2×150 mL) and the filtrate and washes were combined and concentrated by rotary evaporation. The resulting residue was diluted with distilled water (750 mL) with vigorous stirring. The precipitate was filtered off, washed with water (2×75 mL) and the filtrate and washes were combined and extracted with diethyl ether (4×200 mL). The aqueous layer was then saturated by adding solid NaCl followed by extraction with dichloromethane (5×200 mL). The ethereal and dichloromethane extracts were analyzed by TLC and the fractions deemed sufficiently pure were pooled, dried with anhydrous magnesium sulfate, filtered and concentrated to constant weight. The obtained yellow viscous liquid was judged by the NMR analysis to be sufficiently pure for subsequent polymerizations. Product yield was 81.4 g (60%). $^1$H-NMR (300 MHz, $CDCl_3$): 6.51 (s, 2H), 5.26 (s, 2H), 3.65-3.72 (m, 2H), 3.55-3.62 (m, 8H), 3.51-3.54 (m, 2H), 3.37 (s, 3H), 2.87 (s, 2H).

Example 5

This example illustrates the preparation of a second monomer in accordance with an embodiment of the invention, exo-7-oxanorbornene-N-phenyl-5,6-dicarboxyimide.

In a clean 500 mL round bottom flask (RBF) equipped with magnetic stirring bar, Furan (29.51 g, 433.5 mmol) was added to a solution of N-phenyl maleimide (25 g, 144.5 mmol) in 135 mL of acetonitrile. The solution was refluxed at 90° C. for 5 h. A white crystalline solid was obtained upon cooling the reaction mixture. The second monomer was obtained by filtering the solid and purified by recrystallization from acetonitrile (2×). Yield of 19 g, 76%. $^1$H-NMR (300 MHz, $CDCl_3$): δ (ppm) 7.55-7.35 (m, 3H, phenyl), 7.35-7.2 (m, 2H, phenyl), 6.57 (s, 2H), 5.37 (s, 2H), 3.05 (s, 2H).

Example 6

This example illustrates the preparation of a diblock copolymer in accordance with an embodiment of the invention.

The Grubbs $3^{rd}$ generation (G3) catalyst illustrated in Example 3 (18.94 mg, 0.02 mmol) was weighed in a 40 mL vial equipped with a fluoropolymer resin-silicone septa open-top cap. The G3 was dissolved in argon-degassed DCM (10 mL) and transferred via a cannula to a clean 1 L RBF equipped with stirring bar. A solution of the first monomer from Example 4 (1.0 g, 3.21 mmol) in DCM (5 mL) was degassed with argon and transferred into the G3 solution and shirred for 70 minutes. An aliquot of 1-2 mL of the polymer block formed was taken after 65 minutes for molecular weight characterization. A solution of the second monomer (Example 5) (4.0 g, 16.6 mmol) in DCM (110 mL) was degassed with argon and transferred into the growing polymer block solution and was stirred for another 60 minutes. Ethylvinylether (2 mL) was added to the yellow solution of the diblock copolymer to terminate the reaction and allowed to stir for another 20 min. The resulting polymer was precipitated in MeOH (2 L, 2×) to recover the block copolymer as a white solid. The polymer was filtered and dried under vacuum at room temperature. $^1$H-NMR (300 MHz, CDCl$_3$): δ (ppm) 7.7-7.25 (m, 3H, phenyl), 7.25-6.8 (m, 2H, phenyl), 6.3-5.9 (broad, 1H), 5.9-5.3 (broad m, 1H), 5.3-4.9 (broad m, 1H), 4.9-4.2 (broad m, 1H), 4.0-2.90 (broad m, 19H).

Example 7

This example illustrates a method to characterize the diblock copolymer of the present invention involving the Multi-angle Laser Light Scattering and gel permeation chromatography (GPC).

The homopolymer and diblock copolymer obtained in Example 6 was characterized for their molecular weight and molecular weight distribution properties by the MALS-GPC technique under the following conditions:
  Mobile phase: Dichloromethane (DCM).
  Mobile phase temperature: 30° C.
  UV wavelength: 245 nm.
  Columns used: three PSS SVD Lux analytical columns (Styrene-divinylbenzene copolymer network), columns have stationary phase beads of 5 micrometers and has the pore sizes of 1000 A, 100,000 A, and 1,000,000 A, and guard columns.
  Flow rate: 1 mL/min.
  GPC system: waters HPLC alliance e2695 system with UV and RI detectors
  MALS system: The DAWN HELEOS 8 system with 8 detectors operating a laser at 664.5 nm.

The chromatograms are depicted in FIG. 1. The diblock copolymer 2 eluted earlier than homopolymer 1 since it had a higher molecular weight.

Example 8

This example illustrates a method of preparing a self-assembled structure from the diblock copolymer in accordance with an embodiment of the invention.

A 1.0% mass per volume solution of the diblock copolymer from Example 6 was prepared in a mixture of N,N-dimethylformamide (DMF) and tetrahydrofuran (THF) of 70/30 volume % composition. The solution was stirred at room temperature for 3 days before use.

A thin film of each of the above polymer solution was spin coated on a glass substrate at a spinning rate of 2000 rpm. The thin film was annealed in a vapor of dichloromethane for 15 hrs. The resulting thin film was washed and dried to obtain a thin film having a self-assembled structure.

Figure 4:
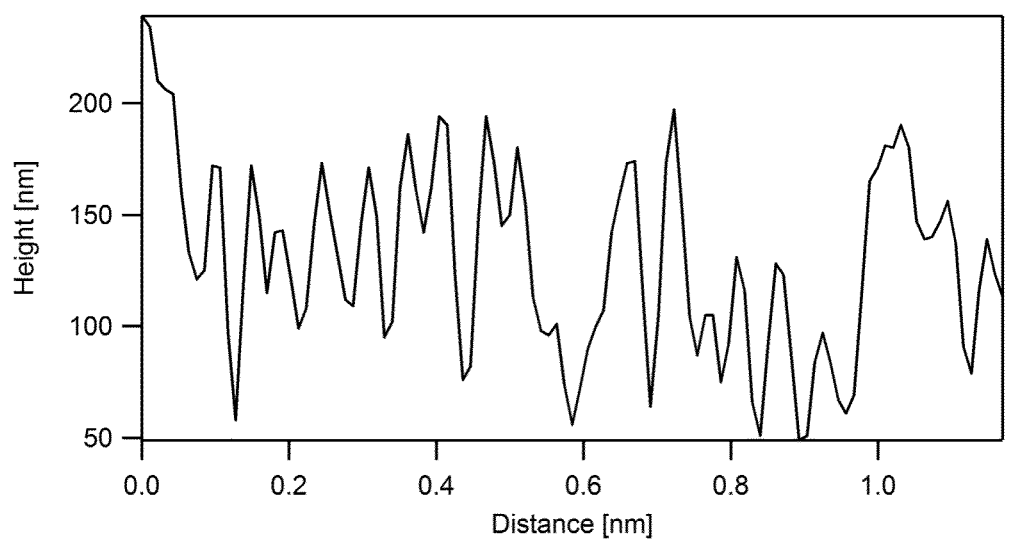
FIG. 4 depicts the line profile extracted from FIG. 3.

FIG. 3 depicts the AFM phase image of the surface of the self-assembled structure obtained. FIG. 4 depicts the line profile extracted from FIG. 3, showing periodicity.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A diblock copolymer of the formula (I):

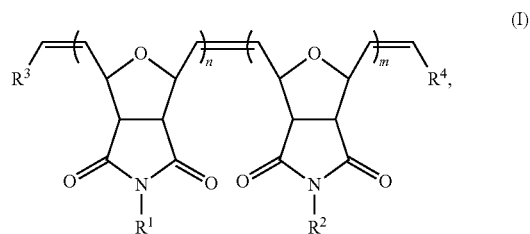

wherein:
  $R^1$ is a poly(alkyleneoxide) group of the formula, —(CHR—CH$_2$—O)$_p$—R', wherein p=3-6, R is H or methyl, and R' is H, a C$_1$-C$_6$ alkyl group, or a C$_3$-C$_{11}$ cycloalkyl group;
  $R^2$ is a C$_6$-C$_{20}$ aryl group, optionally substituted with a substituent selected from halo, alkoxy, alkylcarbonyl, alkoxycarbonyl, amido, and nitro;
  one of $R^3$ and $R^4$ is a C$_6$-C$_{14}$ aryl group or a heteroaryl group, optionally substituted with a substituent selected from hydroxy, halo, amino, and nitro, and the other of $R^3$ and $R^4$ is a C$_1$-C$_{22}$ alkoxy group, optionally substituted with a substituent selected from carboxy, amino, mercapto, alkynyl, alkenyl, halo, azido, and heterocyclyl; and
  n and m are independently 2 to about 2000.

2. The diblock copolymer of claim 1, wherein R is H.

3. The diblock copolymer of claim 1, wherein R' is a $C_1$-$C_6$ alkyl group.

4. The diblock copolymer of claim 1, wherein R' is methyl.

5. The diblock copolymer of claim 1, wherein $R^2$ is a $C_6$-$C_{10}$ aryl group, optionally substituted with a substituent selected from halo, alkoxy, alkylcarbonyl, alkoxycarbonyl, amido, and nitro.

6. The diblock copolymer of claim 1, wherein $R^2$ is a phenyl group, optionally substituted with a substituent selected from halo, alkoxy, alkylcarbonyl, alkoxycarbonyl, amido, and nitro.

7. The diblock copolymer of claim 1, wherein $R^2$ is phenyl.

8. The diblock copolymer of claim 1, wherein $R^3$ is phenyl.

9. The diblock copolymer of claim 1, wherein $R^4$ is a $C_1$-$C_6$ alkoxy group.

10. The diblock copolymer of claim 1, wherein n is about 30 to about 350 and m is about 150 to about 1775.

11. The diblock copolymer of claim 1, wherein n is about 70 to about 200.

12. The diblock copolymer of claim 1, wherein m is about 350 to about 1000.

13. The diblock copolymer of claim 1, which has the following structure:

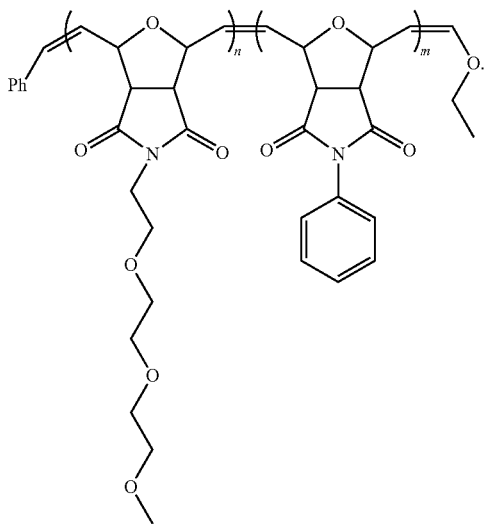

14. A method of preparing a diblock copolymer of claim 1, comprising:

(i) polymerizing one of the two monomers of the formulas:

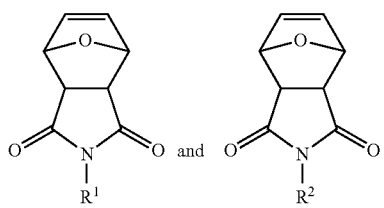

with a ring opening metathesis polymerization (ROMP) catalyst to obtain a ring-opened polymer having a living chain end;

(ii) polymerizing the other of the two monomers on the living end of the ring-opened polymer obtained in (i) to obtain a diblock copolymer having a living end; and (iii) terminating the living end of the diblock copolymer obtained in (ii) with an optionally substituted alkyl vinyl ether.

15. The method of claim 14, wherein the ROMP catalyst is of the formula:

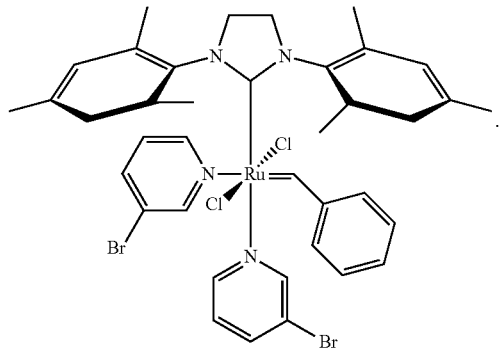

16. A self-assembled structure comprising a diblock copolymer of claim 1.

17. A porous membrane prepared from the self-assembled structure of claim 16.

18. A diblock copolymer of the formula (I):

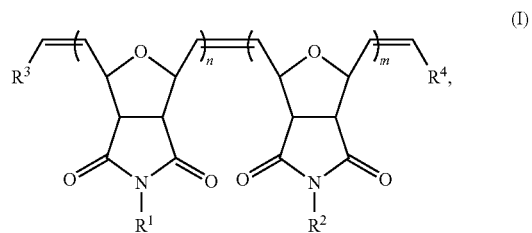

wherein:

$R^1$ is a poly(alkyleneoxide) group of the formula, —(CHR—CH$_2$—O)$_p$—R', wherein p=2-6, R is H or methyl, and R' is a $C_1$-$C_6$ alkyl group or a $C_3$-$C_{11}$ cycloalkyl group;

$R^2$ is a $C_6$-$C_{20}$ aryl group, optionally substituted with a substituent selected from halo, alkoxy, alkylcarbonyl, alkoxycarbonyl, amido, and nitro;

one of $R^3$ and $R^4$ is a $C_6$-$C_{14}$ aryl group or a heteroaryl group, optionally substituted with a substituent selected from hydroxy, halo, amino, and nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl; and n and m are independently 2 to about 2000.

19. A self-assembled structure comprising a diblock copolymer of claim 18.

20. A method of preparing a diblock copolymer of claim 18, comprising:
(i) polymerizing one of the two monomers of the formulas:

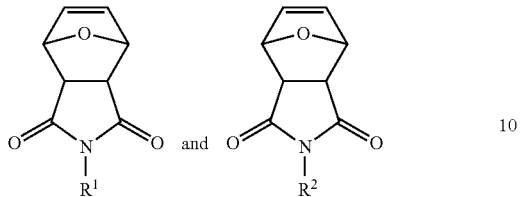

with a ring opening metathesis polymerization (ROMP) catalyst to obtain a ring-opened polymer having a living chain end;
(ii) polymerizing the other of the two monomers on the living end of the ring-opened polymer obtained in (i) to obtain a diblock copolymer having a living end; and
(iii) terminating the living end of the diblock copolymer obtained in (ii) with an optionally substituted alkyl vinyl ether.

\* \* \* \* \*